(12) United States Patent
Rosemann et al.

(10) Patent No.: US 8,613,414 B2
(45) Date of Patent: Dec. 24, 2013

(54) FASTENING CLIP AND ASSOCIATED FASTENER

(75) Inventors: Frank Rosemann, Muenzenberg (DE); Christian Kempf, Wuerzburg (DE); Ansgar Wilting, Grossmehring (DE)

(73) Assignees: Newfrey LLC, Newark, DE (US); Audi AG, Ingolstadt (DE)

( * ) Notice: Subject to any disclaimer, the term of this patent is extended or adjusted under 35 U.S.C. 154(b) by 705 days.

(21) Appl. No.: 12/730,849

(22) Filed: Mar. 24, 2010

(65) Prior Publication Data

US 2010/0264287 A1    Oct. 21, 2010

(30) Foreign Application Priority Data

Mar. 24, 2009    (DE) .................. 10 2009 014 133

(51) Int. Cl.
| | |
|---|---|
| *A47B 96/00* | (2006.01) |
| *A47K 1/00* | (2006.01) |
| *A47K 5/00* | (2006.01) |
| *E04G 5/06* | (2006.01) |
| *F16L 3/08* | (2006.01) |
| *F21V 21/00* | (2006.01) |
| *F21V 35/00* | (2006.01) |

(52) U.S. Cl.
USPC ............ 248/222.11; 248/220.21; 248/220.22; 248/221.11; 248/221.12; 24/297; 24/581.11; 24/662

(58) Field of Classification Search
USPC ............ 248/220.21, 220.22, 221.11, 221.12, 248/222.11, 222.13, 223.41; 24/297, 24/581.11, 662, 666, 669, 682.1; 411/512; 403/252, 253, 263, 353
See application file for complete search history.

(56) References Cited

U.S. PATENT DOCUMENTS

| | | | | |
|---|---|---|---|---|
| 4,697,774 A | * | 10/1987 | Sarton et al. | 248/220.22 |
| 6,457,217 B2 | * | 10/2002 | Yoshii et al. | 24/297 |
| 6,594,870 B1 | * | 7/2003 | Lambrecht et al. | 24/297 |
| 6,715,185 B2 | * | 4/2004 | Angellotti | 24/297 |
| 6,827,320 B2 | * | 12/2004 | Yeh | 248/220.22 |
| 7,077,372 B2 | * | 7/2006 | Moran | 248/222.11 |

(Continued)

FOREIGN PATENT DOCUMENTS

| | | |
|---|---|---|
| EP | 0 432 855 | 6/1991 |
| EP | 0 887 488 | 12/1998 |

(Continued)

OTHER PUBLICATIONS

European Search Report for European Application No. EP 10 15 7621, mailed Jul. 18, 2013 (6 pages).

*Primary Examiner* — Terrell McKinnon
*Assistant Examiner* — Michael McDuffie
(74) *Attorney, Agent, or Firm* — Harness, Dickey & Pierce, P.L.C.

(57) ABSTRACT

A fastening clip for attaching a component to a stud of a support part has a base part with an opening for accepting the stud. The opening has an axis and has a fastening region and an unlocking region located next to one another perpendicular to the axis. Resilient retaining means for holding the stud in place are arranged in the fastening region, which means are designed such that the stud can be introduced into the fastening region in the direction of the axis and the stud located in the fastening region can be displaced into the unlocking region by a relative movement of the stud and fastening clip perpendicular to the axis of the opening, wherein in the unlocking region the stud can be removed from the opening.

21 Claims, 3 Drawing Sheets

(56) References Cited

U.S. PATENT DOCUMENTS

| | | | | |
|---|---|---|---|---|
| 7,152,281 | B2* | 12/2006 | Scroggie | 24/297 |
| 7,165,371 | B2* | 1/2007 | Yoyasu | 52/716.5 |
| 7,677,850 | B2* | 3/2010 | Sano | 411/45 |
| 8,011,071 | B2* | 9/2011 | O'Brien | 24/573.11 |
| 8,079,559 | B1* | 12/2011 | Say | 248/222.12 |
| 8,388,295 | B2* | 3/2013 | Kamiya et al. | 411/508 |
| 2007/0107174 | A1 | 5/2007 | Bordas | |
| 2009/0218464 | A1* | 9/2009 | Kato et al. | 248/316.7 |

FOREIGN PATENT DOCUMENTS

| | | |
|---|---|---|
| FR | 2 622 258 | 4/1989 |
| WO | WO 2007/069057 | 6/2007 |
| WO | WO 2009/018311 | 2/2009 |

\* cited by examiner

FASTENING CLIP AND ASSOCIATED FASTENER

CROSS-REFERENCE TO RELATED APPLICATIONS

This application claims the benefit and priority of German Application No. DE 10 2009 014 133.2, filed Mar. 24, 2009. The entire disclosure of the above application is incorporated herein by reference.

FIELD

The present disclosure relates to a fastening clip and an associated fastener for attaching a component to a stud of a support part, in particular a body part of a motor vehicle.

BACKGROUND

Fastening clips and fasteners are primarily used in automotive manufacture in order to attach mounted parts or trim parts to the body or to body parts such as door or the like. It should be possible to accomplish the attachment as easily as possible and without the aid of tools here, but the attachment should also be releasable in order to be able to carry out maintenance and repairs. On the one hand, the attachment should ensure high retention forces, but, on the other hand, it should permit nondestructive removal force. Moreover, it is frequently necessary to compensate for dimensional deviations in the parts in the region of the fasteners.

Various fasteners of the specified type are known, for example from EP 0,020,308 A1, EP 1,895,171 A2, U.S. Pat. No. 6,196,607 B1. The prior art fasteners have in common that a pin-like element is provided as a connecting part, which is connected to the support part in a locking manner by insertion in an opening of the support part. In this context, the support part must have openings at the fastening points with the result that additional means such as an umbrella-like washer, and possibly additional sealing rings, must be provided so that these openings can be tightly sealed during installation of the mounted or trim parts.

In addition, a device for fastening a sound insulating panel to the body of a motor vehicle is known from WO 02/072390 A1, in which the body has a stud on which can be placed a one-piece fastening element made of plastic. In this design, the fastening element made of plastic is arranged in an opening in the sound insulating panel, and an annular flange of the fastener engages around the sound insulating panel on the side facing away from the car body. Release of the attachment in this design can only be accomplished by overcoming the retention force, and may result in damage to the fastening element.

Furthermore, a plastic clip for fastening a trim strip to the body of a motor vehicle is known from EP 0,489,505 B1, which clip latches together with a T-shaped stud welded to the body panel and has lateral locking fingers that engage in opposing grooves on the inside of the trim strip that is bent in a U-shape. With this clip, too, release must take place in opposition to the retention force.

SUMMARY

According to the teachings herein, a fastening clip for fastening mounted or trim parts to a stud that permits a high retention force while also permitting a low removal force is provided. The joined parts can be nondestructively separated from one another again. Further, according to the present teachings, a fastener that does not require attachment openings in the parts to be joined together is provided. Moreover, the fastener should be easy to install and should be made of simple parts that are economical to manufacture. It should also make it possible to compensate for manufacturing-related dimensional deviations.

The fastening clip according to the present teachings has a base part with an opening for accepting a stud of a support part, wherein the opening has an axis and has a fastening region and an unlocking region located next to one another perpendicular to the axis, and wherein resilient retaining means for holding the stud in place are arranged in the fastening region, which means are designed such that the stud can be introduced into the fastening region in the direction of the axis and the stud located in the fastening region can be displaced into the unlocking region by a relative movement of the stud and fastening clip perpendicular to the axis of the opening, wherein in the unlocking region the stud can be removed from the opening. The fastening clip can be attached to the stud very easily by means of a movement in the axial direction of the opening, and the resilient retaining means for holding the stud in place can be designed such that a high axial retention force can be achieved, since the retention force need not be overcome to release the fastening clip.

Moreover, the resilient retaining means can be designed such that no great force is required to move the stud out of the retaining region into the unlocking region. Consequently, the fastening clip can be released easily and without great application of force, so that the danger of damage from the release process is also very small. The fastening clip remains unharmed in the release process, and can subsequently be reused to fasten a component.

A return lock can be provided in the opening of the fastening clip; once the stud has been moved into the unlocking region, said return lock opposes a return movement of the stud into the retaining region. This design is helpful when the part to be released is attached by means of fastening clips at two or more points. The release can then take place at one fastening point after the other, without the danger that a released point can return to the fastened state when the component is released at a second point.

The resilient retaining means of the fastening region can have at least one resilient locking finger, which extends inward from the edge of the opening in the direction of the axis and whose free end forms a locking tooth. Alternatively, the resilient retaining means can have two opposing, in particular symmetrically arranged, locking fingers.

Furthermore, the locking tooth of the locking finger can be straight and can extend parallel to the common center plane of the fastening region and unlocking region which contains the axis of the opening. In this way, the stud can be moved from the retaining region to the unlocking region without deformation of the locking finger. Furthermore, multiple adjacent retaining positions for the stud can be formed by the extension of the straight locking tooth, so that position deviations between the stud and clip can be compensated during the fastening of the parts.

The return lock can have a resilient locking finger which extends perpendicular to the axis of the opening at a distance from the resilient retaining means and bears a locking projection that projects into the displacement path of the stud and has a ramp surface facing the retaining region and a locking surface facing the unlocking region. The locking finger of the return lock can additionally be arranged such that it limits the penetration depth of the stud into the opening by contact with the end of the stud. Moreover, it is advantageous for the locking finger of the return lock to be located at the wall of the opening that delimits the retaining region and is opposite the unlocking region.

According to another proposal of the invention, the base part of the fastening clip can have an outwardly projecting flange that is meant for attaching the base part to a receptacle part. Moreover, a circumferential groove can be formed in the lateral surface of the base part adjacent to the flange if necessary.

The teachings further provide a fastener for attaching a component to a stud using an inventive fastening clip, wherein the component has a receptacle part, designed as a pocket with a lateral opening and with a pilot slot, in which the fastening clip can be inserted through the lateral opening. The receptacle part can be an integral part of the component or a separate structural element that is attached to the component by adhesive, for example. Preferably the receptacle part has a plate with an open pilot slot on one side of the plate, and has a U-shaped wall on one side of the plate that is arranged to project upright therefrom and surrounds the pilot slot at a distance. The upright wall in this design can be attached to a platelike part of the component at a distance from the plate.

In order to transmit axial retention forces to the receptacle part, provision is made that the fastening clip engages with the outwardly projecting flange in the pocket of the receptacle part, wherein the section of the fastening clip adjoining the flange extends through the pilot slot. The pilot slot preferably has a pilot section that grows larger toward the outside, and a narrow spot formed by retaining projections, which can be expanded by the fastening clip during installation of the same. Installation of the fastening clip is made easier by the pilot slot. The narrow spot ensures that the fastening clip is held in place after insertion in the receptacle part so that it cannot fall out of the receptacle part when the component is transported to the assembly site.

If the fastening clip is provided with a circumferential groove, provision can be made for the plate to engage in the groove with an edge region adjoining the pilot slot, thus determining the position of the fastening clip relative to the component in the axial direction. It is then possible to eliminate a supporting function of the component surface opposite the plate of the receptacle part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
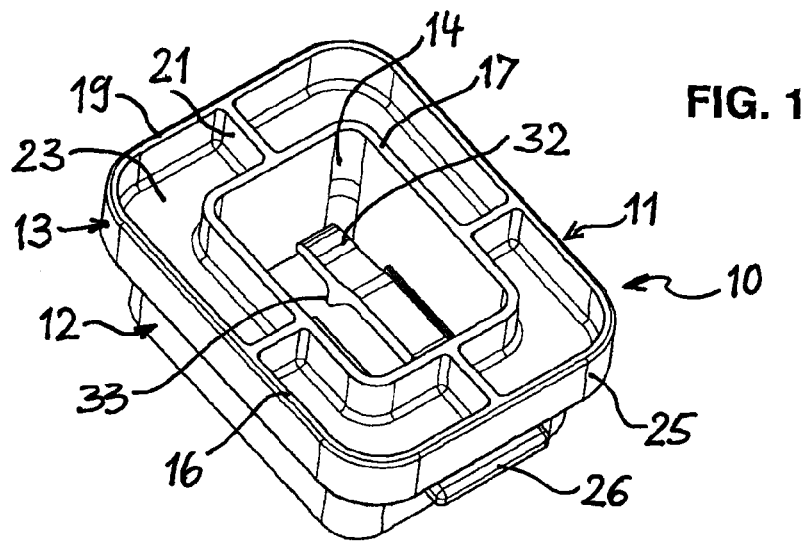
FIG. 1 is a perspective view of the back of a fastening clip according to the invention.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
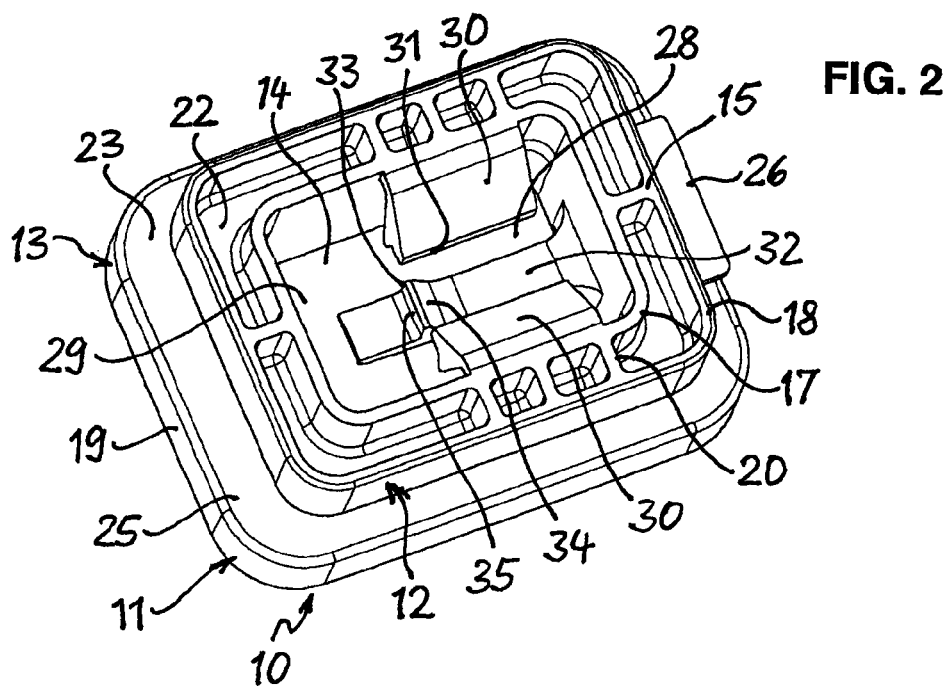
FIG. 2 is a perspective view of the front of a fastening clip from FIG. 1.
Figure 3:
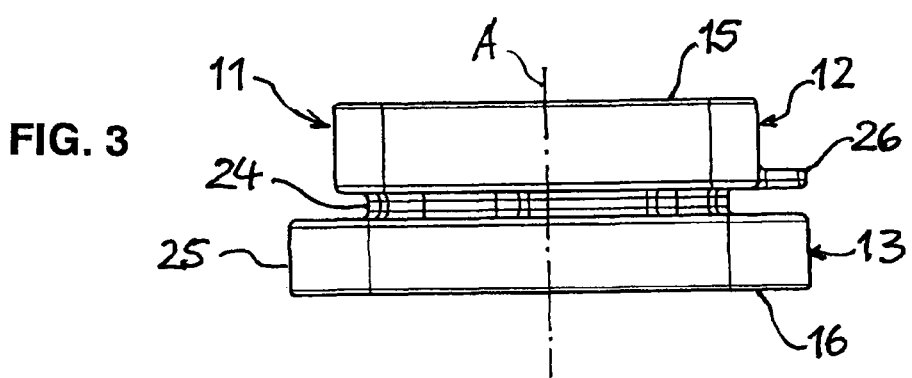
FIG. 3 is a side view of the fastening clip from FIG. 1.

The fastening clip 10 shown in FIGS. 1 through 3 has a base part 11, which is divided into two block-shaped sections 12, 13 of different size. In its center, the base part 11 has a rectangular opening 14, which extends through both sections 12, 13 along an axis A and is shown open at both ends. It can also be closed at one end. The smaller section 12 has a smaller footprint and forms, together with its surface surrounding the opening 14, the front 15. The larger section 13 with the opposing surface forms the back 16, of the base part 11. The side walls of the two sections 12, 13, which surround the opening 14, are double-walled in design, and delimit the opening 14 with an inside wall 17. The section 12 has an outer wall 18 a defined distance from the inner wall 17, and the section 13 has an outer wall 19. The outer walls 18, 19 are connected with the applicable adjacent segment of the inner wall 17 by crosspieces 20 or 21. At their adjoining ends, the sections 12, 13 are delimited by flat, center walls 22, 23, which connect the outer walls 18, 19 with the inner wall 17, and are additionally connected to one another by ribs at the inner wall 17. A groove 24 is formed by a separation between the center walls 22, 23.

The larger section 13 projects beyond the smaller section 12 on all sides, thereby forming a bearing flange 25, on which the fastening clip 10 can be braced in the direction of the axis A. Located on the outside of the section 12, parallel to the flange 25, is a rib 26, which serves to define the installation position of the fastening clip 10 and to prevent incorrect installation. The rib 26 extends to a plane generally co-planar to outer wall 19.

The opening 14 contains a retaining region 28 and an unlocking region 29. Located opposite one another in the retaining region 28 are two opposed locking fingers 30, which are attached by one end to the forward end of the inner wall 17 in an elastically resilient way. The locking fingers 30 project inward into the opening 14, and are inclined toward the axis A in such a way that their spacing decreases from the outside to the inside. The inner ends of the locking fingers 30 form locking teeth 31, which extend parallel to one another in the longitudinal direction of the opening 14. The locking fingers 30 and locking teeth 31 terminate approximately in the center of the opening 14 so that the adjoining unlocking region 29 is free of locking teeth.

Arranged in the retaining region 29 in the vicinity of the rearward end of the opening 14 is an elastic finger 32, which is attached to the section of the inner wall 17 that runs in the transverse direction, and which extends into the unlocking region 29. A sawtooth-shaped locking projection 33 is attached to the finger 32 on the side facing the front 15; said locking projection has a ramp surface 34 facing the retaining region 28 and has a locking surface 35 facing the unlocking region 29. The locking surface 35 delimits the unlocking region 29 with respect to the retaining region 28 and lies in a plane at which the locking fingers 30 and locking teeth 31 also terminate.

Figure 4:
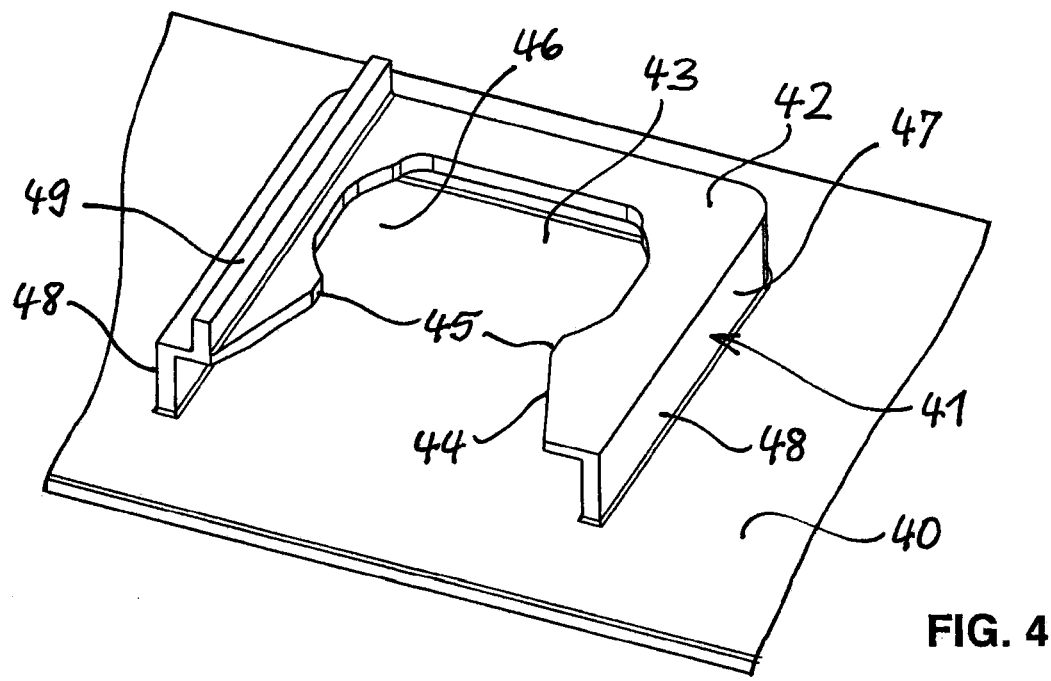
FIG. 4 is a perspective view of a receptacle part for receiving the fastening clip from FIG. 1.

FIG. 4 shows a component 40 that is meant to be attached using the described fastening clip 10. In order to join the fastening clip 10 to the component 40, said component has a receptacle part or doghouse 41 in which the fastening clip 10 can be inserted. The receptacle part 41 consists of a flat plate 42 with a pilot slot 43 that forms a pilot region 44 expanding in a wedge shape toward the pilot opening, a narrow spot formed by retaining projections 45, and an end region 46 that has a greater width than the narrow spot. A U-shaped wall 47 extends along the outer edge of the plate 42. The wall 47 is perpendicular to the plate 42 and has a uniform height, so that the plate 42 is located at a constant distance from the component 40. The wall 47 has two side sections 48, which are located on two sides of the pilot slot 43 and are oriented parallel to one another. Additionally, a guide rib 49 is arranged parallel to one of the side sections 48 on the top of the plate 42 facing away from the component 40.

Figure 5:
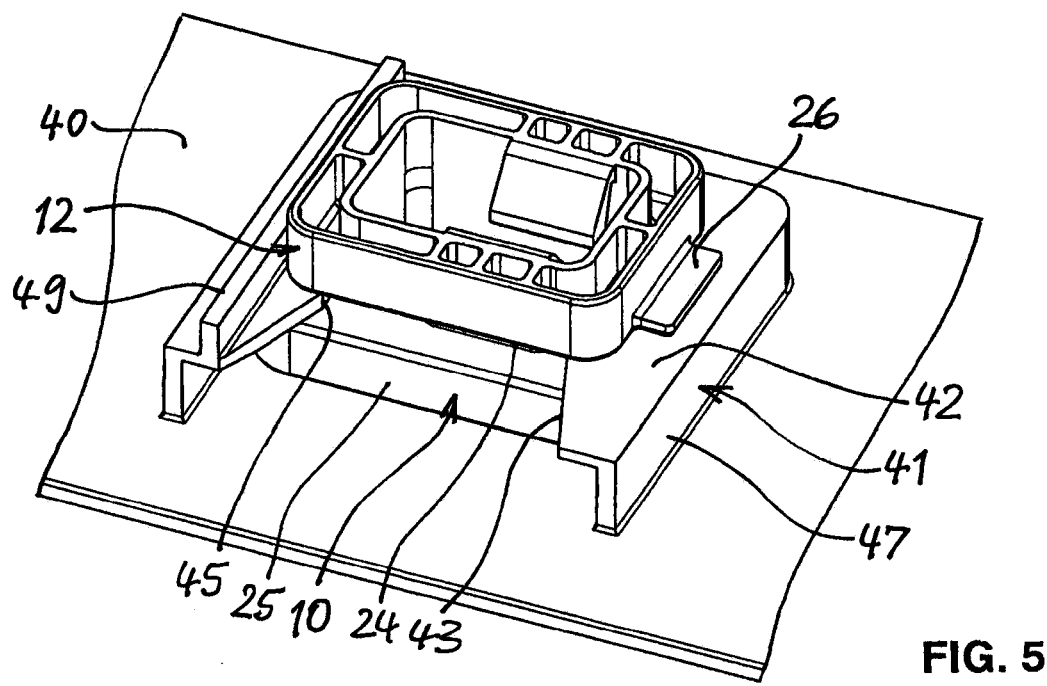
FIG. 5 is a perspective view of the receptacle part from FIG. 4 with the fastening clip from FIG. 1 inserted.

In order to connect the fastening clip 10 to the component 40, said clip is pushed through the lateral opening into the pocket formed by the receptacle part 41, as shown in FIG. 5. The correct position of the fastening clip 10 in the receptacle part 41 is ensured here firstly by the guide rib 49 and the height of the wall 47 of the receptacle part 41, and secondly by the rib 26 and the thickness of section 12 of the fastening clip 10. Thus, the collision of the rib 26 with the guide rib 49 prevents installation of the fastening clip 10 in a position that has been rotated by 180°. Moreover, the greater thickness of the section 12 as compared to the height of the wall 47 prevents the section 12 from being inserted in the pocket between the component 40 and the plate 42. Installation of the fastening clip 10 in a position rotated by 90° from the position in FIG. 5 is prevented by the fact that the width of the flange 25 is smaller than the width of an end region 36 of the pilot slot 43, so that the fastening clip 10 cannot find proper support in the receptacle part 41. Moreover, the fastening clip 10 would not find support at the narrow spot formed by the retaining projections 45, and would fall out of the receptacle part 41 again. Thus, incorrect installation of the fastening clip 10 is efficaciously prevented.

In order to attach the fastening clip 10 to the component 40, the fastening clip 10, with its longitudinal side forward, is pushed into the receptacle part 41 as shown in FIG. 5. In the process, the pocket of the receptacle part 41 receives the flange 25, and the edge of the plate 42 delimiting the pilot slot 43 engages in the groove 24. The outside diameter of the fastening clip 10 measured in the longitudinal direction is somewhat greater in the region of the groove 24 than the narrow spot formed by the retaining projection 45 so that the fastening clip 10 must be forced into the end region 46 of the pilot slot 43 with a certain amount of force and elastic deformation thereof. In the final position shown in FIG. 5, the core cross section of the fastening clip 10 in the region of the groove 24 is located entirely within the end region 46, so that the retaining projections 45 that were forced somewhat apart during installation now spring back to their original position and hold the retaining clip 10 in place in the receptacle part 41.

Figure 6:
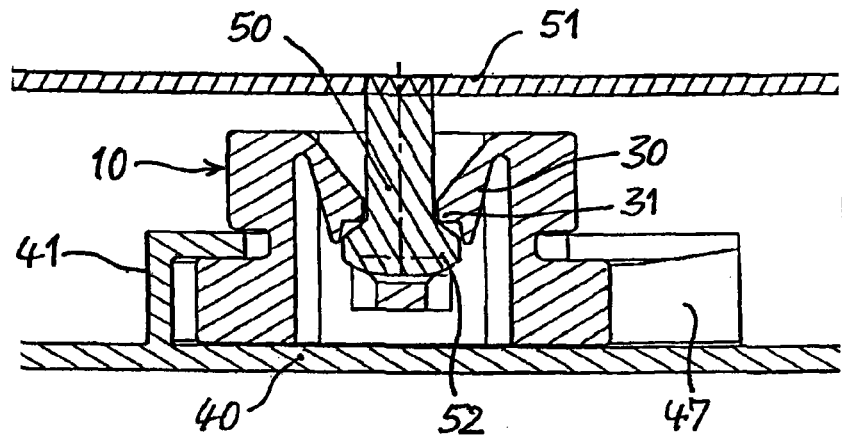
FIG. 6 is a cross section through a fastener according to the invention joining two components together.
Figure 7:
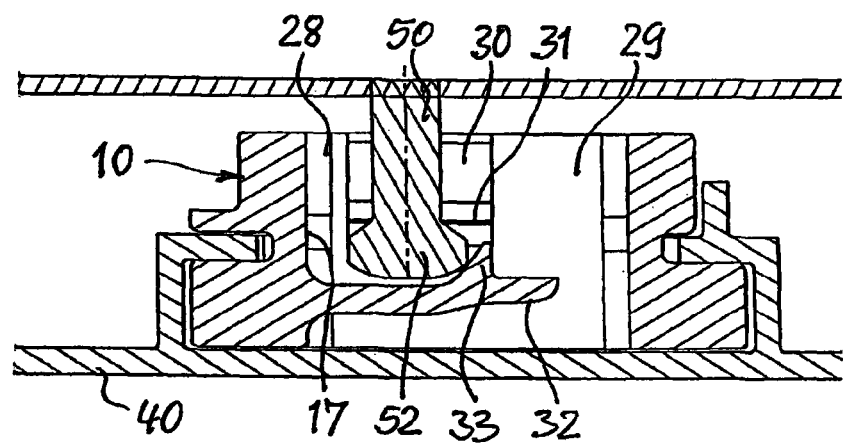
FIG. 7 is a longitudinal section through the fastener from FIG. 6 in the fastened position.

Once the fastening clip 10 has been joined to the component 40, the two pieces can be attached to the stud 50 of a support part 51, as shown in FIGS. 6 and 7. The stud 50 is designed as a so-called T-stud head, and the end of its shank is welded to the support part 51 for attachment. The free end of the stud 50 projecting from the support part 51 is provided with a head 52 of larger diameter; the locking teeth 31 of the locking fingers 30 of the fastening clip 10 can brace against the underside of said head. In place of a T-stud, it is also possible to connect another stud, such as a threaded stud, to the fastening clip 10.

During installation, the component 40, together with the fastening clip 10, is arranged in front of the stud 50 in such a way that the head 52 of the stud can enter the retaining region 28. By pressing the component 40 onto the support part 51, the locking fingers 30 are elastically forced apart by the head 52, to then spring back to their initial position after the head 52 has slid past the locking teeth 31.

In the final position shown in FIGS. 6 and 7, the locking teeth 31 brace against the underside of the head 52 and the shank of the stud 50, thus holding the fastening clip 10, and with it the component 40, firmly on the support part 51. In this fastening position, the head 52 is located between the locking projection 33 and the inner wall 17, with the diameter of the head 52 being smaller than the distance between the locking projection 33 and inner wall 17. The clearance in the longitudinal direction that is thus provided between the fastening clip 10 and the head 52 permits for compensation of dimensional deviations in the installation position between the support part 51 and the component 40. Dimensional deviations in the transverse direction of the fastening clip 10 can be compensated by a slidability of the fastening clip 10 relative to the receptacle part 41.

Figure 8:
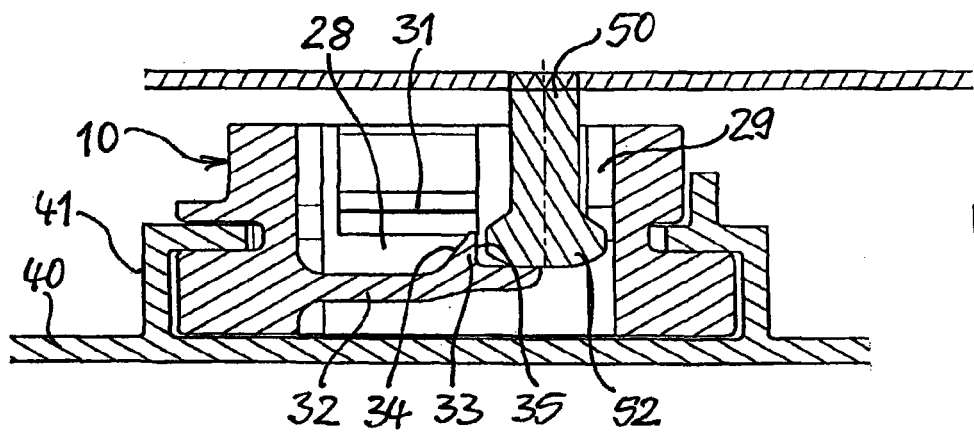
FIG. 8 is a longitudinal section through the fastener from FIG. 6 in the released position.

In order to release the attachment of the component 40, this is elastically deformable such that the region with the receptacle part 41 can be pushed in the longitudinal direction of the fastening clip 10 relative to the stud 50 such that the stud 50 reaches the unlocking region 29, as shown in FIG. 8. During this process, the head 52 of the stud 50 slides along the locking teeth 31, so that they are not damaged. As a result of contact of the head 55 with the ramp surface 34 of the locking projection 33, moreover, the finger 32 is bent towards the component 40, so that the head 52 can slide past the locking projection 33. As soon as the stud 50 and its head 52 are located in the unlocking region 29, the finger 32 springs back to its original position, so that the locking surface 35 of the locking projection 34 is now opposite the cylindrical lateral surface of the head 52. As a result of this, the stud 50 cannot be forced back into the retaining region 28. The stud 50 can be pulled out of the unlocking region 29 unhindered, and thus the component 40 can easily be removed from the support part 51. Even when the stud 50 is being pulled out, it cannot get back into the retaining region 28, since the head 52 is prevented herefrom by contact with the end faces of the locking fingers 30.

As the described removal process shows, the retention force of the locking fingers 30 need not be overcome during release, and there is no danger of damage to the locking teeth 31. The fastening clip 10 can thus be used again, with the same level of retention forces being achieved as before. The use of the fastening clip according to the invention is not restricted to the fastener described. The fastening clip can be used in all fastening arrangements in which movability is provided for displacement of the stud out of the retaining region into the unlocking region.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A fastening clip for attaching a component to a stud associated with a supporting part comprising:
 a base coupled to the component and defining an opening for accepting the stud, wherein the opening has an axis and has a fastening region and an unlocking region located next to one another in a direction perpendicular to the axis, said fastening region having a resilient retaining flange configured to hold the stud in place when the stud is disposed in the fastening region to thereby attach the component to the supporting part, wherein the stud can be introduced into the fastening region in a direction generally parallel to the axis of the opening, wherein the stud located in the fastening region can be displaced along a displacement path into the unlocking region by a relative movement of the stud perpendicular to the axis of the opening, and wherein in the unlocking region the stud can be removed from the opening; and
 further comprising a return lock arranged in the opening, said return lock opposes movement of the stud along said displacement path from the unlocking region to the fastening region after the stud has been moved into the unlocking region.

2. The fastening clip according to claim 1, wherein the return lock has a resilient finger which extends generally perpendicular to the axis of the opening, said return lock being located at a distance from the resilient retaining flange and having a locking projection that projects into the displacement path of the stud, said return lock having a ramp surface facing the fastening region and a locking surface facing the unlocking region.

3. The fastening clip according to claim 2, wherein the finger of the return lock is configured to limit the penetration depth of the stud into the opening by contact with the end of the stud.

4. A fastening clip for attaching a component to a stud associated with a supporting part comprising:
 a base coupled to the component and defining an opening for accepting the stud, wherein the opening has an axis and has a fastening region and an unlocking region located next to one another in a direction perpendicular to the axis, said fastening region having a resilient retaining flange configured to hold the stud in place when the stud is disposed in the fastening region to thereby attach the component to the supporting part, wherein the stud can be introduced into the fastening region in a direction generally parallel to the axis of the opening, wherein the stud located in the fastening region can be displaced along a displacement path into the unlocking region by a relative movement of the stud perpendicular to the axis of the opening, wherein in the unlocking region the stud can be removed from the opening, and further, wherein the resilient retaining member of the fastening region has at least one resilient locking finger, which extends inward from the edge of the opening in a locking position and whose free end forms a locking tooth.

5. The fastening clip according to claim 2, wherein the resilient retaining flange comprises two opposed, symmetrically arranged, locking fingers.

6. The fastening clip according to claim 2, wherein a locking tooth of the resilient finger is straight and extends parallel to a common center plane dividing the fastening region and unlocking region.

7. A fastening clip for attaching a component to a stud associated with a supporting part comprising:
a base coupled to the component and defining an opening for accepting the stud, wherein the opening has an axis and has a fastening region and an unlocking region located next to one another in a direction perpendicular to the axis, said fastening region having a resilient retaining flange configured to hold the stud in place when the stud is disposed in the fastening region to thereby attach the component to the supporting part, wherein the stud can be introduced into the fastening region in a direction generally parallel to the axis of the opening, wherein the stud located in the fastening region can be displaced along a displacement path into the unlocking region by a relative movement of the stud perpendicular to the axis of the opening, wherein in the unlocking region the stud can be removed from the opening, and further wherein the base has an outwardly projecting flange configured for attaching the base to a receptacle part of the component.

8. A fastening clip for attaching a component to a stud associated with a supporting part comprising:
a base coupled to the component and defining an opening for accepting the stud, wherein the opening has an axis and has a fastening region and an unlocking region located next to one another in a direction perpendicular to the axis, said fastening region having a resilient retaining flange configured to hold the stud in place when the stud is disposed in the fastening region to thereby attach the component to the supporting part, wherein the stud can be introduced into the fastening region in a direction generally parallel to the axis of the opening, wherein the stud located in the fastening region can be displaced along a displacement path into the unlocking region by a relative movement of the stud perpendicular to the axis of the opening, wherein in the unlocking region the stud can be removed from the opening, and further wherein the base has a lateral surface with a circumferential groove arranged approximately in the center thereof.

9. A fastening clip for attaching a component to a stud associated with a supporting part comprising:
a base coupled to the component and defining an opening for accepting the stud, wherein the opening has an axis and has a fastening region and an unlocking region located next to one another in a direction perpendicular to the axis, said fastening region having a resilient retaining flange configured to hold the stud in place when the stud is disposed in the fastening region to thereby attach the component to the supporting part, wherein the stud can be introduced into the fastening region in a direction generally parallel to the axis of the opening, wherein the stud located in the fastening region can be displaced along a displacement path into the unlocking region by a relative movement of the stud perpendicular to the axis of the opening, and wherein in the unlocking region the stud can be removed from the opening, and further wherein the component defines a receptacle part having a pocket defining a lateral opening and a pilot slot, which is configured to accept the fastening clip when inserted through the lateral opening.

10. The fastener clip according to claim 9, wherein the base is configured to engage with a projecting flange in the pocket of the receptacle part.

11. The fastener according to claim 10, wherein the receptacle part has a plate defining an open pilot slot on one side of the plate, and has a U-shaped wall arranged on one side of the plate to project therefrom and that surrounds the pilot slot at a distance.

12. The fastener according to claim 11, wherein the U-shaped wall is attached to a platelike portion of the component at a distance from the plate.

13. The fastener according to claim 9, wherein the pilot slot has a tapered pilot section, and a narrow spot formed by a pair of retaining projections, which can be expanded by the fastening clip during installation of the same.

14. The fastener according to claim 11, wherein the base defines an external groove and wherein an edge region of the plate adjoining the pilot slot engages in the groove of the base.

15. A fastening clip for attaching a first component having a receptacle portion to a flanged component having a fastener portion, the fastening clip comprising:
a base defining a coupling groove engaged with the receptacle portion to couple the fastening clip to the first component, and further having an opening defining an axis for accepting the fastener portion of the flanged component, wherein the opening further has a fastening region and an unlocking region, said fastening region having a pair of resilient opposed retaining flanges configured to hold the fastener portion of the flanged component in place when the fastener portion is disposed in the fastening region to thereby attach the first component to the flanged component, wherein the fastener portion of the flanged component is configured to be introduced into the fastening region in a direction generally parallel to the opening axis, and wherein the fastener portion is selectively displaceable along a displacement path from the fastening region to the unlocking region by a relative movement of the flanged component in a direction perpendicular to the axis of the opening, and wherein in the unlocking region the fastener portion of the flanged component can be removed from the opening.

16. The fastening clip according to claim 15, further comprising a return locking flange configured to resist the movement of the fastener portion of the flanged component from the fastening region to the unlocking region.

17. The fastening clip according to claim 16, wherein the locking flange has a resilient finger which extends generally perpendicular to the axis of the opening at a distance from the pair of resilient opposed retaining flanges and comprises a locking projection that projects into the displacement path of the fastener portion and has a ramp surface facing the fastening region and a locking surface facing the unlocking region.

18. The fastening clip according to claim 17, wherein the resilient finger is configured to limit the penetration depth of the fastener portion into the opening by contact with an end of the fastener portion.

19. The fastening clip according to claim 18, wherein the pair of resilient retaining flanges in the fastening region have at least one resilient locking finger, which extends inward from an edge of the opening in a locking position and whose free end forms a locking tooth.

20. The fastening clip according to claim 19, wherein the fastener portion of the flanged component has an enlarged head portion, and further wherein said resilient locking finger is configured to deflect outward from said locking position toward the edge of the opening when engaged by the head of the fastener portion when the fastener portion is inserted into the fastening region generally parallel to said axis, and to return to said locking position when the head of the fastener portion passes the locking tooth at the free end of said resilient locking finger, to thereby secure the fastener portion from withdrawal from said fastening region in a direction generally parallel to said axis.

21. The fastening clip according to claim 4, wherein the stud has an enlarged head portion, and further wherein said resilient locking finger is configured to deflect outward from said locking position toward the edge of the opening when engaged by the head of the stud when the stud is inserted into the fastening region generally parallel to said axis, and to return to said locking position when the head of the stud passes the locking tooth at the free end of said resilient locking finger, to thereby secure the stud from withdrawal from said fastening region in a direction generally parallel to said axis.

* * * * *